United States Patent
Kafka

[15] 3,656,514
[45] Apr. 18, 1972

[54] HIGH RELIABILITY JOINT FOR MANUFACTURE OF PIPE

[72] Inventor: Robert Stickney Kafka, Maitland, Fla.

[73] Assignee: Julian C. Renfro, Winter Park, Fla. a part interest

[22] Filed: Sept. 18, 1968

[21] Appl. No.: 773,682

[52] U.S. Cl. ............................ 138/166, 138/171, 138/154, 29/470.6, 29/473.7
[51] Int. Cl. ................................................. F16l 13/02
[58] Field of Search .................. 138/166, 154, 163, 170, 171, 138/156; 29/470.6, 477.3, 470 T, 473.7, 449; 52/578; 287/189.36

[56] References Cited

UNITED STATES PATENTS

| 1,933,279 | 10/1933 | Quarnstrom | 138/156 |
| 1,502,052 | 7/1924 | Naylor | 138/154 X |
| 1,943,035 | 1/1934 | Naylor | 138/154 X |
| 1,952,955 | 3/1934 | Trageser | 138/171 |
| 2,067,801 | 1/1937 | Taylor | 138/171 X |
| 2,288,094 | 6/1942 | Karmazin | 138/154 X |
| 2,884,958 | 5/1959 | Asselin | 138/171 |
| 3,199,541 | 8/1965 | Richitelli | 138/154 X |

FOREIGN PATENTS OR APPLICATIONS

| 1,487,218 | 5/1967 | France | 138/154 |

*Primary Examiner*—Herbert F. Ross
*Attorney*—Julian C. Renfro

[57] ABSTRACT

This invention relates to a novel joint particularly well suited for use in the continuous and rapid manufacture of high pressure pipe, tubing or the like. The pipe so manufactured may be made in a wide range of diameters and helix angles, with my novel joint possessing sufficient mechanical strength that unraveling of the pipe joint simply will not occur. For pipes to be manufactured for use underwater or underground, or to carry particularly high pressure, I may additionally utilize brazing material on a continuous basis along the joint, thus assuring against porosity, even under high stress conditions.

6 Claims, 3 Drawing Figures

INVENTOR.
ROBERT STICKNEY KAFKA

HIGH RELIABILITY JOINT FOR MANUFACTURE OF PIPE

This invention relates to a novel joint configuration usable for example in the creation of pipes, tubing or the like, and more particularly to a joint configuration possessing mechanical strength before as well as after welding, which joint can be readily adapted to highly satisfactory pressure proofing procedures.

In the past a number of joints suitable for use in the manufacture of pipe and conduit have been proposed. Some of these joints have been self-clinching to such an extent that flexible helical conduit in the nature of BX cable could be rapidly produced at minimum expense. However, such pipe or conduit could not withstand internal or external pressure and such techniques could obviously not be employed in the construction of pipes designed for a hostile environment, such as for use in underground or underwater locations.

Other procedures have been proposed involving the use of metal strips having pre-prepared left and right edges so that when wound into a generally helical arrangement, adjacent edges could be welded or otherwise secured together to create a pipe or conduit that would withstand internal pressure. However, the edges of such prior art arrangements did not physically and mechanically interfit, and the finished pipe could not withstand any sizable amount of mechanical loading. Moreover, such pipe was suitable only for low pressure applications.

In accordance with this invention I have provided a novel joint suitable for use in making conduit, pipe, tubing or the like, which possesses great strength, and which joints can be fabricated easily and economically so that finished pipe suitable for use in underground or underwater locations can be made in the size desired at a location adjacent to the site of intended use.

I typically work with malleable strip material such as of steel, aluminum or plastic of comparatively thick gauge, and by the use of more or less conventional rolling or forming techniques prepare the opposite edges of the strip material to form novel male and female configurations, so that at the time joining of the two edges is to be brought about, the edges will physically and mechanically interfit.

As set forth in the Mar. 11, 1968 edition of Product Engineering on page 109, various new techniques are now available for making large-diameter tubing in accordance with spiral winding techniques, with mechanical locking of adjacent edges being utilized instead of welding procedures. My present invention is to some extent based upon such principles, in that during the manufacture of tubing utilizing a spiral lock seam, I utilize strip material having opposite edges that interfit with a substantial amount of self alignment, resulting in initial joint strength. Certain techniques may be utilized for clinching the joint, with thereafter appropriate heating means being employed so that the interfitting male and female edges will be heated to an extent necessary for diffusion welding. Immediately thereafter the heated edges are passed through working means designed to tightly compress and lock the joints into a highly satisfactory seam in accordance with diffusion welding techniques. Then, the pipe is moved into a position for immediate use.

Significantly, my novel joint technique possesses mechanical strength both before and after welding, and further, when metallic pipe is involved, readily lends itself to a highly advantageous pressure leak sealing technique such that the finished pipe or conduit can be exposed to pressures in the vicinity of several thousands pounds per square inch. This latter technique may involve the use of brazing material or the like inserted directly into the interfitted joints subsequent to heating but prior to diffusion welding of the joints. The basic physical property of the inserted material is its high fluidity under this circumstance, with the result being that all possible interstices of the joint are effectively closed, and porosity prevented.

It is therefore an object of my invention to provide a joint technique that lends itself to a wide range of pipe and joint fabrication requirements.

It is another object of my invention to provide a pipe joint technique involving novel interfitting edge beads that maintain individuality through to the finished joint, thus possessing strength not possessed by prior art techniques wherein the adjacent beads disappeared during the welding process.

It is still another object of my invention to provide a novel joint technique by the use of which pipe having an entirely smooth inner surface may be created.

It should be noted that my technique makes it possible for male and female edge beads in accordance with my novel concepts to be utilized in the manufacture of conduit at a wide range of helix angles. My concepts may be employed at virtually any helix angle between 0° and 90°, with the diameter of the pipe or conduit increasing as a function of the tangent of the helix angle.

These and other objects, features and advantages of my invention will be more apparent from a study of the appended drawings in which.

Figure 1:
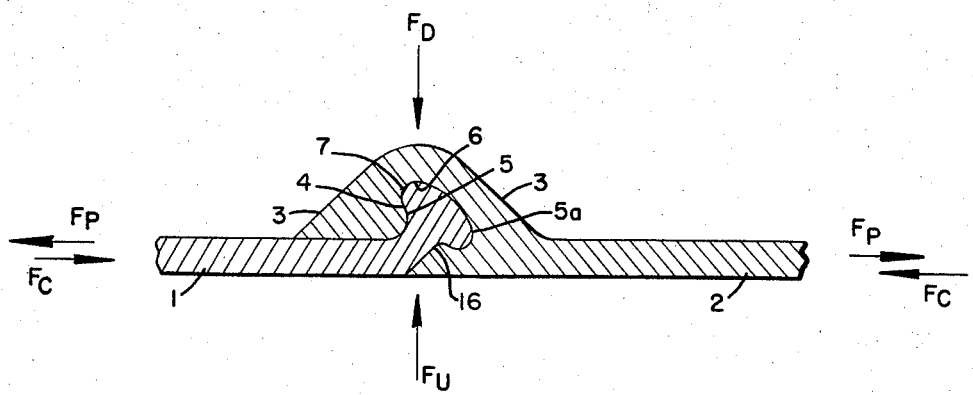
FIG. 1 illustrates a cross-section of a typical finished pipe joint in accordance with my invention.
Figure 2:
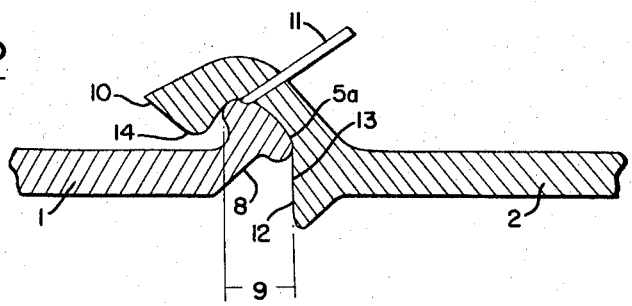
FIG. 2 illustrates the pipe joint at an earlier period in time, shortly after the male and female members have been initially interfitted.
Figure 3:
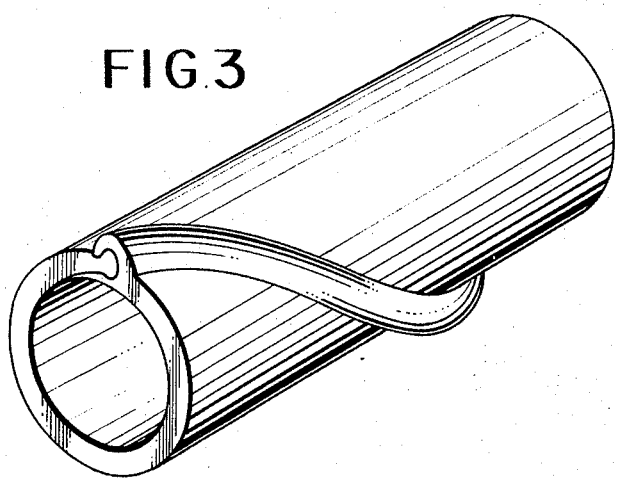
FIG. 3 is a perspective view to a smaller scale of a portion of a finished pipe in accordance with my technique.

Referring to FIGS. 1 and 2 it will be noted that strip material 1 and strip material 2 have each been provided with a distinctive edge configuration such that the edges may be initially interfitted in the general manner shown in FIG. 2 and even then possess some mechanical strength. This fact is of consequence when it is realized that some applications of my novel joint technique may involve the manufacture of pipe having a helical joint, with strip material 1 and strip material 2 depicted in FIGS. 1 and 2 actually being different portions of the same original piece of strip material that has been helically wound in the general manner shown in FIG. 3.

It should be noted in FIGS. 1 and 2 that the right hand edge of piece 1 has been rolled so as to form an inclined flange 8 as a continuation of the upper and lower surfaces of piece or member 1 extending upwardly and forwardly so that the upper surface of the flange extends above the level of the top surface of piece 1 and has an enlarged transversely positioned oval shaped bulbous part 4 at the extremity of said flange, said bulbous part including an edge portion forming an upper hook portion 5 extending transversely of the flange, upwardly and rearwardly, and an opposite edge portion forming a lower hook portion 5a extending transversely of the flange downwardly and forwardly. The flange 8, the bulbous part 4, the upper hook portion 5 and the lower hook portion 5a all extend continuously along the edge of piece 1. On the other hand, the left hand edge of piece 2 has been rolled or otherwise configured so as to have a hook portion 10 that can somewhat encircle and interfit with hook portion 5, as well as a heel portion 13 that can be brought into tightly interfitting contact with the hook portion 5a as a result of the application of vertical forces. Although my joint may be produced without heat being involved, the heating of the edge members materially reduces the working forces and thus enables the size of the equipment to be reduced.

Significantly, the upper portion of the left edge of piece 2 is configured so that when the interfitting edges have been put together, a "balanced" arrangement is created such that there is no tendency for the joint to shift either to the right or to the left during the subsequent rolling and/or forging process. A rolling or forging technique is typically utilized for converting the joint shown in FIG. 2 into the finished joint shown in FIG. 1, and because a balanced force system is utilized, this allows a highly desirable large movement of metal (or plastic) to take place with no external restraints being involved. In other words, a groove on the upper roller or forging hammer interfits with the external portion 3 of hook 10, thereby preventing a tendency toward lateral shift. Thus, the channel member has a rounded exterior portion configured such that a balanced force is involved when heat and pressure are utilized to accomplish diffusion welding.

The channel or groove continuously formed along the edge of piece 2 is open in the direction such that the hook portion of piece 1 tends to move as a result of elasticity or springiness of the material, toward rather than away from the inner portion of the hook 10. The dimension that the channel is open to receive the hook is represented by the dimension 9 in FIG. 2.

After the edges have been interfitted in the manner shown in FIG. 2, heating techniques such as may employ a gas flame, an induction heater or the like are utilized so as to bring these edges up to a desired temperature. When steel is involved, the temperature is quite high, whereas for aluminum and plastic, the temperatures are proportionately lower. Immediately after heating, forming means such as rolls of appropriate contour are utilized for applying vertical forces to bring about closure of the portions 10 and 13 about the hook portions 5 and 5a in the general manner shown in FIG. 1, thus to accomplish the construction of a highly satisfactory joint possessing mechanical strength both from the interior as well as exterior directions. It should be noted that considerable working of the malleable material shown in FIG. 2 is involved in causing the toe 14 to scrape along the top of piece 1, and heel 13 to move so that surface 12 closely conforms to the lower contour of piece 1 adjacent the lower hook portion 5a as indicated at 16. These motions and the accompanying material working are desirable from several metallurgical considerations, such as the cleaning of the upper surface of piece 1 by this scraping action, and the increase of strength of all components. The amount of flow of the material necessary to effect the joint can be controlled in light of the nature of the material. It should be noted also that part 10 of the channel in closed position fits closely against the upper surface of member 1 and the upper surface of flange 8 as well as the hook portion 5, while part 13 of the channel in closed position fits closely against the lower surface of flange 8 as well as the hook portion 5a and the lower surface of part 13 is flush with the lower surfaces of members 1 and 2.

When working with steel, my technique can be extended so as to involve the addition of brazing material 11 into the groove 6 adjacent the uppermost portion of hook 5, such being accomplished immediately prior to the closure of the joint of the piece 2. Because of the considerable heat involved, the brazing material is caused to fluidize and permeate a part of the joint, the extent depending upon the amount of brazing material used, to effectively seal it as shown at 7 against leakage even though the joint may thereafter be subject to internal or external pressures in the vicinity of several thousand pounds per square inch. This point is important inasmuch as the appearance of brazing material outside the joint is usually undesirable in that such material might well be attacked as a result of electrolytic action.

With regard to the finished joint shown in FIG. 1, four forces are illustrated. These are $F_p$ indicating pull force, $F_c$ indicating compression force, $F_u$ meaning force upward (or internal) force, and $F_D$ meaning downward (external or collapsing) force. A fifth force not illustrated here is slip force, or force along the joint.

Examination of this novel joint configuration reveals that all these forces are resisted by the mechanical shape of the joint, and that the welding and brazing merely enhances its strength. The high mechanical strength inherent in my joint means that the finished joint has higher strength than the parent material. This is of consequence when it is realized that in a helical joint, the hoop strength of the parent material cannot be relied upon to support the joint. The initial clinching brought about in FIG. 2 is usually sufficient to prevent slip along the joint, even before any working of the material is brought about.

It should be noted that the discrete bead in accordance with my invention acts as a reinforcement to prevent the occurrence of kinking or collapse of the pipe when the pipe has been subjected to bending forces along unsupported lengths of substantial dimension.

As should now be apparent, I have provided a novel joint that may be used with a wide range of types of malleable material. Although I may utilize this joint in joining flat sections of material together, this joint is admirably suited for use when pipe is being manufactured involving a helical joint. This latter is true from the several standpoints that the edge configurations can be created immediately before the male and female edges are to be brought together; the edges fit together easily and strongly resist separation; and closure of the joint can be effected on a continuous basis. Balanced forces are involved in creating a joint, the joint strengthens the pipe being formed, and the joint does not inhibit flow through the pipe. Inasmuch as my joint possesses considerable mechanical strength from many standpoints, unraveling of pipe simply will not occur. Because of these attributes, the pipe may be lowered directly into the water or earth on a continuous basis as the pipe is being made.

Other configurations and utilizations of my invention will be apparent to those skilled in the art, and I am not to be restricted to those shown and described herein except as required by the scope of the appended claims.

I claim:

1. An interlocking joint suitable for use in a tube made utilizing the forging characteristics of malleable material comprising a member with a first edge having a continuous upwardly and forwardly extending flange at the end of which is formed a continuous transversely extending bulbous portion, said bulbous portion protruding above the top surface of said member and including a continuous upper hook portion extending upwardly and rearwardly and a continuous lower hook portion extending downwardly and forwardly, and a second edge along which a continuous channel is formed, said channel being open to an extent sufficient to receive said bulbous portion including said upper hook portion and said lower hook portion, said channel being then closed so as to fit around said bulbous portion including said upper hook portion and said lower hook portion in a tight and permanent manner and the joint being welded.

2. The joint as defined in claim 1 in which brazing material is disposed inside said channel along said bulbous portion at the time of closure of the joint, to assure against porosity in said joint.

3. The joint as defined in claim 1 in which said channel member has a rounded exterior portion configured such that a balanced force is involved when heat and pressure are utilized to accomplish diffusion welding.

4. A tube having a spiral seam comprising an interlocked joint as claimed in claim 1.

5. A tube as claimed in claim 4 in which said joint is disposed entirely on the exterior leaving the interior of the tube without internal obstruction due to the joint.

6. An interlocked joint as claimed in claim 1, in which said flange forms a continuation of the upper and lower surfaces of said member and a major portion of said bulbous portion extends above the upper surface of said member, the part of the channel which when closed fits around said upper hook portion also fitting closely against the flange and the upper surface of said member, and the part of the channel which when closed fits around the lower hook portion also fitting closely against the flange and having a lower surface in the same plane as the lower surface of the member.

* * * * *